(12) United States Patent
Nayyar et al.

(10) Patent No.: US 11,333,738 B2
(45) Date of Patent: *May 17, 2022

(54) BUFFER SAMPLE SIZE CONTROL FOR VARIABLE CHIRP RADAR

(71) Applicant: TEXAS INSTRUMENTS INCORPORATED, Dallas, TX (US)

(72) Inventors: Jasbir Singh Nayyar, Punjab (IN); Brian Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,544

(22) Filed: Mar. 20, 2019

(65) Prior Publication Data

US 2019/0219671 A1    Jul. 18, 2019

Related U.S. Application Data

(63) Continuation of application No. 15/701,252, filed on Sep. 11, 2017, now Pat. No. 10,281,562, which is a
(Continued)

(51) Int. Cl.
*G01S 7/35* (2006.01)
*G01S 13/28* (2006.01)
(Continued)

(52) U.S. Cl.
CPC ............ *G01S 7/352* (2013.01); *G01S 13/282* (2013.01); *G01S 13/343* (2013.01); *G01S 7/285* (2013.01); *G01S 13/931* (2013.01)

(58) Field of Classification Search
CPC ........ G01S 7/352; G01S 7/285; G01S 13/282; G01S 13/343; G01S 13/931
See application file for complete search history.

(56) References Cited

U.S. PATENT DOCUMENTS 8,400,349 B1    3/2013    Dubbert
9,191,043 B1   11/2015    Zhang
(Continued)

FOREIGN PATENT DOCUMENTS

RU     2510685      4/2014
RU      155321      9/2015

OTHER PUBLICATIONS

Reinhardt, Steven K. "Direct Memory Access (DMA)" EECS 373 F99 Notes. p. 11-1 <http://www.eecs.umich.edu/courses/eecs373.w04/Lectures/stever_old_lectures/lec11.pdf> (Year: 1999).*

(Continued)

*Primary Examiner* — Matthew M Barker
(74) *Attorney, Agent, or Firm* — Brian D. Graham; Charles A. Brill; Frank D. Cimino

(57) ABSTRACT

A method of radar signal processing includes providing an analog front end (AFE) including an amplifier coupled between an antenna and an ADC in a receive path, where an ADC output is coupled to an input of an elastic ADC buffer (elastic buffer) including a divided memory with for writing samples from the ADC (samples) while reading earlier written samples to a first signal processor by a high speed interface. A transmit path includes at least one power amplifier provided by the AFE coupled to drive an antenna. A Greatest Common Divisor (GCD) is determined across all chirps in a radar frame programmed to be used. For each frame a sample size for the elastic buffer is dynamically controlled constant to be equal to the GCD for reading samples from one memory block and writing samples to another memory block throughout all chirps in the frame.

20 Claims, 3 Drawing Sheets

Related U.S. Application Data continuation of application No. 14/939,703, filed on Nov. 12, 2015, now Pat. No. 9,759,808.

(51) Int. Cl.
  *G01S 13/34* (2006.01)
  *G01S 7/285* (2006.01)
  *G01S 13/931* (2020.01)

(56) References Cited

U.S. PATENT DOCUMENTS

| | | |
|---|---|---|
| 2007/0069943 A1 | 3/2007 | Adams |
| 2008/0204308 A1 | 8/2008 | Mayer |
| 2014/0197983 A1 | 7/2014 | Reuter |
| 2016/0077134 A1 | 3/2016 | Rezk |
| 2018/0231636 A1* | 8/2018 | Maher ............... G01S 13/42 |

OTHER PUBLICATIONS

Jianjun Yu, et al., "A Direct Digital Synthesis Based Chirp Radar Transmitter in 0.13 pm SiGe Technology", 2013 IEEE Bipolar/BiCMOS Circuits and Technology Meeting (BCTM), bordeaux, 2013, pp. 41-44.

A. Battisti, et al., "The Chirp Up-Converter and Amplifier (CUCA) for theERS-1 Radar Altimeter", 1986 16th European Microwave Conference, Dublin, ireland, 1986, pp. nil1-nil6.

* cited by examiner

BUFFER SAMPLE SIZE CONTROL FOR VARIABLE CHIRP RADAR

This application is a continuation of application Ser. No. 15/701,252, filed Sep. 11, 2017, currently pending, which is a continuation of application Ser. No. 14/939,703 filed Nov. 12, 2015, now U.S. Pat. No. 9,759,808, both of which are incorporated herein by reference in their entireties.

FIELD

Disclosed embodiments relate to radar systems which support variable length analog-to-digital converter (ADC) data transfers.

BACKGROUND

A conventional radar sensor unit (radar system) comprises an analog front end (synthesizer, mixer, analog-to-digital converters (ADCs, etc.), a signal processing module/unit (e.g., fast Fourier transforms (FFTs), Digital signal processor (DSP) or a microcontroller unit (MCU). Data processing in the radar system is performed on a system cycle/frame basis.

A frame includes N number of frequency-modulated continuous-wave (FMCW) ramps/chirps. A chirp is a smallest logical unit of data used for radar processing. In classical radar systems, each chirp in a frame includes the same number of ADC samples and the same sampling rate. A typical interface between the ADCs and the signal processing unit is one of the known high speed interfaces (HSIs), such as comprising low-voltage differential signaling (LVDS) or a camera serial interface (CSI, e.g., CSI-2).

One application for radar systems is for automotive collision avoidance. An automotive radar front end needs to transfer the ADC sampled data from received radar signals to the DSP or other signal processing module over the HSI. Each burst of 'M' (e.g., 128, 256 or 512) ADC samples that is transmitted over the HSI is called a chirp, and 'N' is number of such chirps that make up a radar frame. A DSP typically processes the data frame-by-frame to determine the range, velocity and angle of any obstacle/vehicle in front of the radar system of the vehicle.

In a typical automotive radar system each chirp in the respective frames include the same number of ADC samples. To simplify the design and reduce the cost of additional components such as adding another phase lock loop (PLL)-based clock in the radar system, a pipelined first-in-first-out (FIFO) ping-pong/circular buffer can be used in the receive path. A ping-pong buffer has a divided memory with at least 2 memory blocks (or instances), so that while one memory block is writing received radar information the other memory block can be deleting the previously written information. Such a buffer provides the elasticity and flexibility in choosing the HSI lane data rates decoupled from ADC sampling rate usually specified in several million samples per second (MSPS). With the advancement of CMOS-based radars, it is possible to choose the chirp profiles different within a frame to enhance the radar system performance, typically with the number of ADC samples being different from chirp to chirp in the frames.

SUMMARY

This Summary briefly indicates the nature and substance of this Disclosure. It is submitted with the understanding that it will not be used to interpret or limit the scope or meaning of the claims.

Disclosed embodiments recognize in high performance radar systems, chirps of different length and sampling rates are interleaved at the frame level, there is a variable ADC sampling rate, and the number of ADC samples can vary from chirp to chirp in each radar frame. Existing radar system solutions rely on the sampling rate and sample size being the same across all the chirps in the frame and hence either directly use the analog-to-digital converter (ADC) clocks divided version directly (Nyquist ADC) or an additional phase lock loop (PLL) (front ends filtering and flexible resampler after the ADC) without an ADC buffer positioned in-between the ADC (or ADCs) and the signal processing unit. It is also recognized high speed interface (HSI) receivers do not support regularly changing interface clock rates, such as chirp to chirp. Furthermore, HSI receivers do not expect to receive data to be transmitted to the signal processor in random size bursts, so that throttling (gaps between the bursts) is not allowed. Both of these factors complicate the radar system design.

One solution uses a ping-pong buffer between the ADCs and the signal processor which generally works well to reduce the cost of additional PLL(s). However, this scheme fails if the above-described variable factors (variable ADC sampling rate, variable number of ADC samples from chirp to chirp in the frame) are present in the radar system application.

Disclosed radar systems include an elastic ADC buffer (hereafter an "elastic buffer", such as a ping-pong buffer) between the ADC(s) and a bus referred to herein as a HSI. The elastic buffer includes a divided memory with at least 2 memory blocks for writing samples from the ADC (samples) while reading earlier written samples out to a first signal processor by the HSI. Each radar frame received can include a plurality of chirps having different numbers of samples per chirp.

A Greatest Common Divisor (GCD) is dynamically determined for frame-by-frame across all chirps in the frame programmed to be used by the radar system so that the GCD is determined before the first chirp in each frame. For each frame, a size for the samples (sample size) for the elastic buffer is dynamically controlled to be equal to the GCD for reading samples from one of the memory blocks and writing samples to another of the memory blocks throughout all chirps in the frame, wherein each chirp having more samples than the GCD is divided into sub-chirps having 2 or more increments equal to the GCD.

BRIEF DESCRIPTION OF THE DRAWINGS

Reference will now be made to the accompanying drawings, which are not necessarily drawn to scale, wherein.

DETAILED DESCRIPTION

Figure 1:
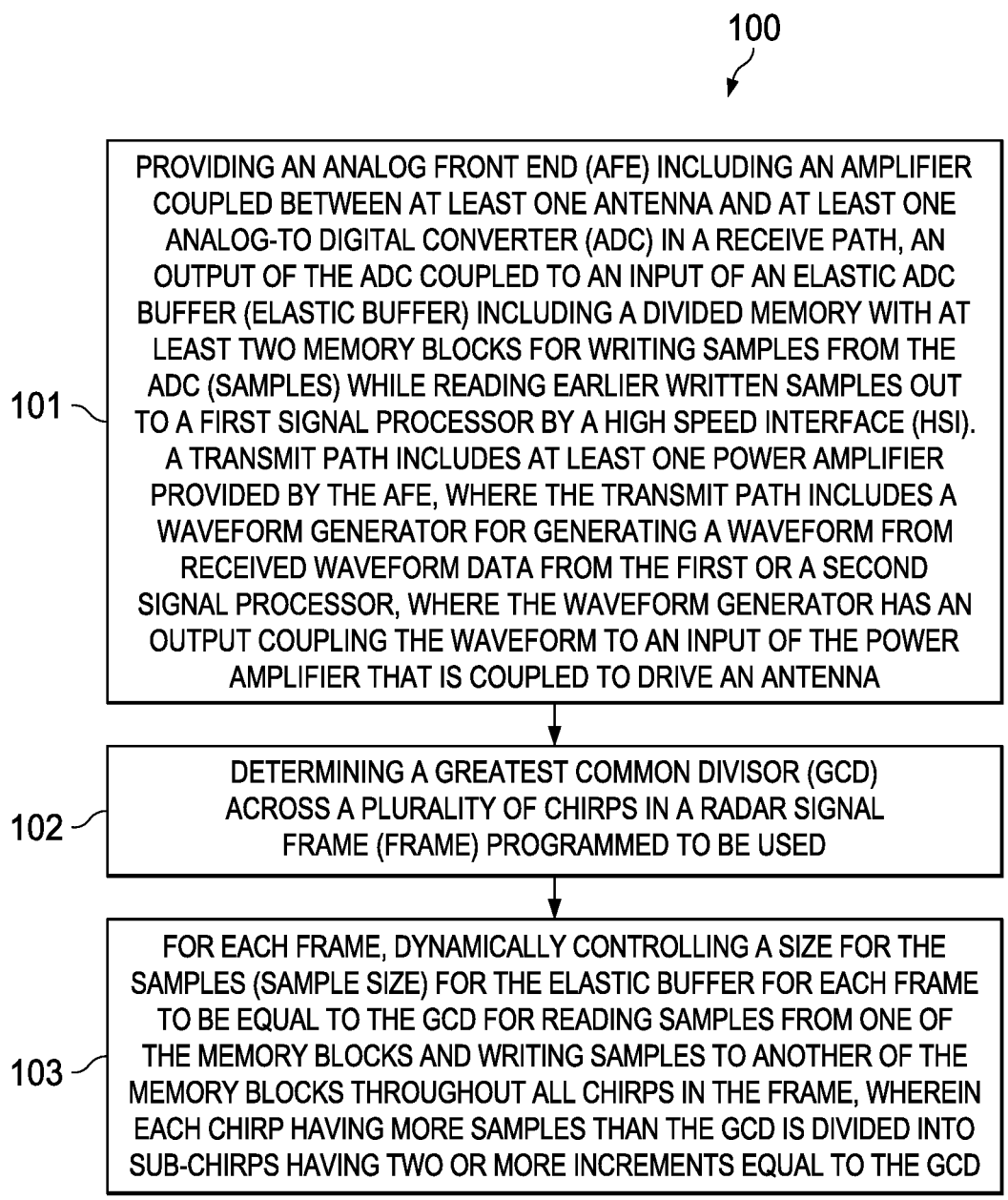
FIG. 1 is a flow chart that shows steps in an example method of radar signal processing where the sample size for the elastic buffer's reading samples from memory blocks and writing samples to memory blocks for all chirps in the frame is controlled to be equal to the GCD, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one example embodiment, software can include one or more lines of code or other suitable software structures operating in a general purpose software application, such as an operating system, and one or more lines of code or other suitable software structures operating in a specific purpose software application.

Disclosed embodiments include an elastic buffer in the receive path between the ADC(s) and HSI that is dynamically controlled frame-to-frame so that that the sample size for reading samples from a memory block and writing samples to another memory block for all chirps in each frame is equal to the GCD for the frame. A timing engine (e.g., Radar Timing Generator (RTG)) can be used for the dynamic control. An "elastic buffer" as used herein is a buffer that has a divided memory with at least 2 memory blocks/instances (e.g., first memory block and a second memory block), so that while one memory block is writing newly received radar information the other memory block can be deleting the previously received radar information/ data that is read out.

Ping-pong buffers are known to be a specialized form of FIFO (First-In, First-out) queue that divides a block of storage typically into two equal halves, with one half (the write buffer) generally always available for writing, and the other half (the read buffer) generally emptied in one fell swoop when the write buffer fills and the ping-pong action makes the former write buffer now available for reading. Ping-pong buffers are similar to ring or circular buffers in that one can keep writing to them so long as the corresponding reads process empties the buffer before it fills.

As noted above, in a typical radar application, all the chirps are of same size. In more recent high performance radar applications, the chirps in each frame are of size $k*2^n$ ADC samples, k being a small integer, and n can be different from chirp to chirp in the frame, such as for imaging objects at different distances for a motor vehicle for collision avoidance applications. For example, assume for a given frame there is at least one chirp with 128 samples, at least one chirp with 256 samples, and at least one chirp with 512 samples.

The radar system has the frame parameters (chirp sequence including the number of samples per chirp) programmed before transmitting the first chirp in the frame. This programmed frame information is used to determine that the GCD is 128 in this specific frame example, and the elastic buffer's sample size for reading stored radar data from one memory block and writing radar data to another memory block is controlled to be the GCD=128 samples (constant). Each burst (128 samples) thus becomes uniform (non-throttling) and the same sample size in each frame. As a result, the HSI lane rate is never needed to be greater than the highest ADC sampling rate used, being 10 million samples per second (MSPS) in this particular example. Usually the ADC sampling rate will be quoted in MSPS unit (MSPS=maximum conversion rate of the ADC, usually is equal to maximum sampling frequency).

Figure 2:
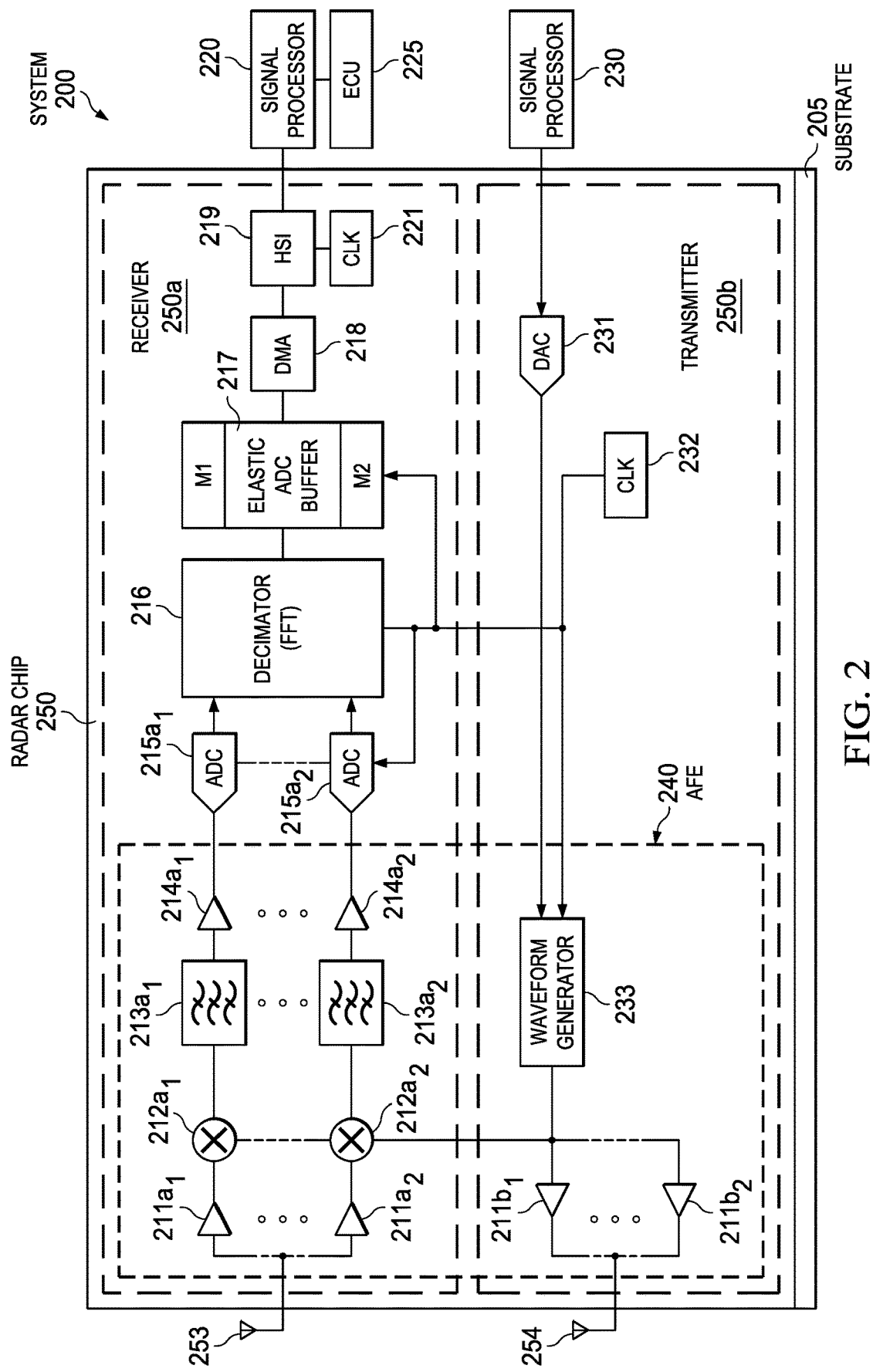
FIG. 2 is a block diagram of radar system including an example radar front end including an example radar front end chip having a disclosed elastic buffer between the ADCs and the HSI, according to an example embodiment.

FIG. 1 is a flow chart that shows steps in an example method 100 of radar signal processing where the sample size for the elastic ADC buffer's reading samples from one memory block and writing samples to another memory block for all chirps in the frame is controlled to be equal to the GCD, according to an example embodiment. FIG. 2 is a block diagram of radar system 200 including an example radar front end chip (radar chip) 250 that can be used to implement method 100. Step 101 comprises providing an analog front end (AFE) 240 including an amplifier ($214a_1$, $214a_2$) coupled between at least one antenna shown as receive antenna 253 and at least one ADC $215a_1$, $215a_2$ in a receive path provided by the receiver 250a. The output of the ADCs $215a_1$, $215a_2$ are coupled to an input of the elastic buffer 217 shown as an "elastic ADC buffer" in FIG. 2 which includes a divided memory with at least 2 memory blocks (shown as M1 and M2) for writing samples received from the ADC (samples) while reading earlier written samples out to a first signal processor 220 by an HSI 219.

The HSI 219 can be an internal bus. The respective memory blocks (M1 and M2) are configured to switch writing and reading functions after a filling an emptying cycle is completed. A transmit path includes at least one power amplifier provided by the AFE 240, and a waveform generator coupled by DAC 231 to receive waveform data from the second signal processor 230. The waveform generator 233 has an output coupled to an input of the power amplifier ($211b_1$, $211b_2$) that is coupled to drive the transmit antenna 254.

Step 102 comprises determining a GCD across all chirps in a radar signal frame (frame) programmed to be used. Each frame may include chirps having at least two different numbers of samples. Step 103 comprises for each frame dynamically controlling a size for the samples (sample size) in each chirp to be equal to the GCD for the elastic buffer 217 for reading samples from one of the memory blocks (say M1 at one time) and writing samples to another of the memory blocks (say M2 at that time) throughout all chirps in the frame, where each of the plurality of chirps having more samples than the GCD are divided into sub-chirps having 2 or more increments equal to the GCD. The HSI lane rate as a result is not needed to be greater than the highest sampling rate on the frame.

The radar chip 250 in FIG. 2 is shown formed on a substrate 205. Radar chip 250 is generally a complementary metal oxide semiconductor (CMOS) chip formed on substrate 205 that includes a multichannel receiver 250a having a receive antenna 253 and a multichannel transmitter 250b having a transmit antenna 254. The substrate 205 has at least a semiconductor surface, and may comprise silicon, such as bulk silicon or silicon epi on a bulk silicon substrate. The substrate 205 may also generally comprise other materials, such as elementary semiconductors besides silicon including germanium. The substrate 205 may also generally comprise a compound semiconductor.

An output from the receive antenna 253 is coupled to an input of low noise preamplifiers $211a_1$ and $211a_2$ associated with respective receive channels 1 and 2. The outputs of the preamplifiers 211a1 and 211a2 are coupled to mixers $212a_1$ and $212a_2$, respectively, having outputs coupled to inputs of band pass filters $213a_1$ and $213a_2$, respectively. The mixers $212a_1$ and $212a_2$ down-convert the received RF signal. The outputs from the band pass filters $213a_1$ and $213a_2$ are coupled to amplifiers $214a_1$ and $214a_2$, respectively, which are coupled to ADCs $215a_1$, and $215a_2$ which have outputs coupled to a decimator 216 shown as being FFT-based.

The decimator 216 is for decimating down the radar signal to the required sampling rate. The output of the decimator 216 is coupled to an input of the elastic buffer 217. The output of the elastic buffer 217 is shown coupled to a direct memory access (DMA) block 218. DMA is a feature of computer systems that allows certain hardware subsystems to access main system memory (e.g. random access memory (RAM)) independently of the central processing unit (CPU). A DMA controller can generate memory addresses and initiate memory read or write cycles. It contains several processor registers that can be written and read by the CPU. These include a memory address register, a byte count register, and one or more control registers. The control registers specify the I/O port to use, the direction of the transfer (reading from the I/O device or writing to the I/O device), the transfer unit (byte at a time or word at a time), and the number of bytes to transfer in one burst.

The output of the DMA block 218 is coupled to first signal processor 220 by HSI 219 which is clocked by clock (CLK) 221. HSI 219 can comprise low-voltage differential signaling (LVDS) or a camera serial interface (CSI), such as CSI-2.

The output of the first signal processor 220 is shown coupled to the input of an engine control unit (ECU) 225 which is provided to support an engine control function including collision avoidance based on processing radar data. In the engine control application, the first signal processor 220 processes the radar data frame-by-frame to determine the range, velocity and angle of any obstacle/vehicle in front of the radar system of the vehicle.

For engine control applications the antenna system for radar system 200 is generally a multistatic antenna system comprising a plurality of transmit antenna (2 transmit antennas) and a plurality of receive antennas (e.g., 3 antenna for 3 channels). The RF signal to the two transmit antennas can be time-multiplexed on a per sweep basis and the receiver channels shown work in parallel. Thus, for example, with 5 antennas, 6 propagation paths of different length are obtained to enable the location of objects around the vehicle in 3-D space.

The transmitter 250b is shown including a second signal processor 230 which can be the same or a different signal processor as the first signal processor 220. The output of the second signal processor 230 is shown coupled to the input of a DAC 231. A waveform generator (or synthesizer) 233 can receive waveform data inputs from DAC 231 and clock 232 that is coupled to the inputs of amplifiers $211b_1$ and $211b_2$ which drive the transmit antenna 254. However, DAC 231 is not necessary as the waveform generator 233 itself can directly synthesize the waveform after receiving the waveform data from the second signal processor 230. First signal processor 220 and second signal processor 230 in one embodiment are provided by one or more microcontroller units (MCUs).

Data processing in radar systems 200 is performed on a system cycle/frame basis. Frame includes n number of frequency-modulated continuous-wave (FMCW) ramps/chirps that may be sawtooth waveforms (see FIG. 3 described below).

As described above, disclosed embodiments include achieving radar system flexibility without putting a challenging lane transfer rate requirement on the HSI 219 that is present for an alternative solution where the HSI lane data rates is increased to take care of a worst case combination of two consecutive chirps. As described in the examples below, for the alternative solution there is a 40 MSPS HSI lane transfer rate requirement, while for the worst case sampling rate in the frame the HSI lane transfer rate requirement the same 10 MSPS (¼ of 40 MSPS) is constant across the entire frame for disclosed embodiments.

Advantages of disclosed embodiments include a relatively simple radar board design that still supports different sample size chirps in a frame since there is no additional complexity due to conventional HSI lane transfer rate requirements. A more simplified receiver design results due to no need to support for lane transfer rate changes from chirp to chirp and non-uniform bursts in the radar system design. Moreover, no handshaking is needed for throttling (handshaking between the ADC(s) $215a_1$ and $215a_2$ and controller for the HSI 219), while still meeting the existing feature of a decoupled sampling rate from the HSI lane rate without needing an additional clock such as a PLL-based clock.

Examples

Disclosed embodiments are further illustrated by the following specific Examples, which should not be construed as limiting the scope or content of this Disclosure in any way.

In this example, the elastic buffer is described as a ping-pong buffer with a ping section (Pi) and a pong (Po) section. The chirps in the simplified example frame include Chirp A with 256 samples, Chirp B with 512 samples and Chirp C with 128 samples. Assume a constant ADC sampling rate from chirp to chirp. While 512 samples for chirp B is being transmitted (read from) from the ping section of the ping-pong buffer, the pong section is capturing (writing) the 128 ADC samples for chirp C. Accordingly, 512 samples (chirp B) have to be transmitted out before the chirp C duration is completed. As a result, a circular buffer scheme is needed so that the data gets averaged across the chirps, but it is recognized herein that averaging still does not solve the problem completely as there is still a risk of a ping-pong buffer over/under run issue.

Adding a variable sample rate factor, the problem becomes further complicated. Using this same example thus puts a non-realistic requirement on the HSI lane rate. The HSI lane rate needed is 4x=to 512 samples needed to be transmitted in the same duration while 128 samples @ 10 MSPS from the ADC(s) is being captured in ping-pong buffer. So, even though the highest sampling rate in any of the chirps shown is only 10 MSPS, the HSI lane rate used by HSI 219 needed is 40 MSPS.

Figure 3:
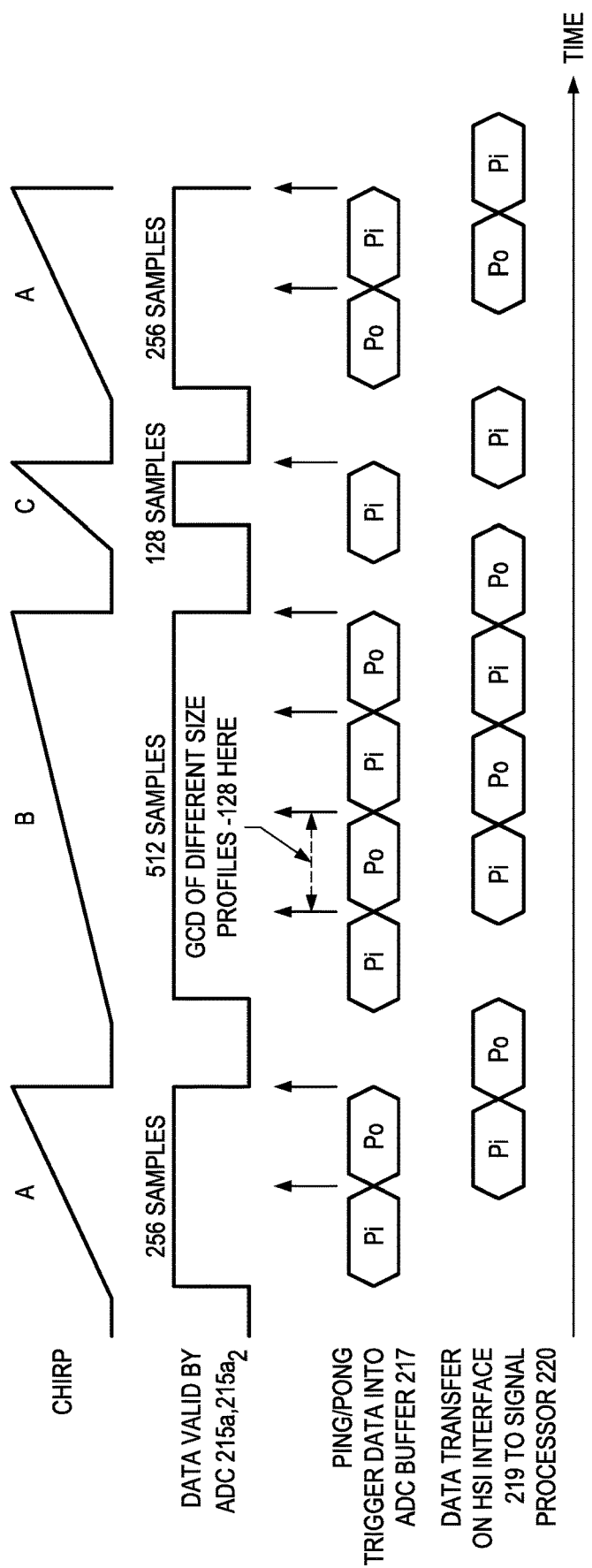
FIG. 3 is a depiction of radar system operation of radar system shown in FIG. 2 across the simplified frame where a GCD is determined across all chirps in the frame that is programmed to be used, and the ping-pong buffer is controlled so that such the sample size for each switch between writing and reading functions is dynamically determined from the GCD for both reading samples from memory blocks and writing samples to the memory blocks throughout all the chirps in the frame, according to an example embodiment.

FIG. 3 is a depiction of radar system operation of radar system 200 in FIG. 2 across the simplified example frame described above where a GCD is determined across all chirps in the frame that is programmed to be used, and the ping-pong buffer is controlled so that such the sample size for each switch between writing and reading functions is dynamically determined from the GCD for both reading samples from memory blocks and writing samples to the memory blocks throughout all the chirps in the frame. Using the ping-pong buffer in the signal path with the sample size set to the GCD of all the chirps in each frame (here 128 samples) can be seen to solve the above described problem. As the GCD of the all the chirps in this frame is 128, the ping-pong buffer switching (reading samples from the memory blocks or writing samples to the memory blocks throughout all the chirps in the frame) is controlled to happen every GCD=128 samples. Each burst (128 samples) thus becomes uniform (non-throttling) and the same size. As a result, the HSI lane rate used by HSI 219 is not needed to be greater than the highest sampling rate required (≥40 MSPS), instead the HSI lane rate needed is 10 MSPS in this example.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A method comprising:
receiving, by an analog front end, a plurality of chirps in a radar signal frame, the plurality of chirps comprising a first chirp and a second chirp;
sampling, by at least one analog-to-digital (ADC) converter, the first chirp, to generate a first set of samples;
sampling, by the at least one ADC, the second chirp, to generate a second set of samples;
controlling a read or write size of a memory block of an elastic buffer to be equal to a greatest common divisor (GCD) across the plurality of chirps in the radar signal frame;
reading the first set of samples of the first chirp from a first memory block of the elastic buffer, after controlling the read or write size of the elastic buffer; and
writing the second set of samples of the second chirp to a second memory block of the elastic buffer, after controlling the read or write size of the elastic buffer.

2. The method of claim 1, further comprising dividing the first set of samples into a first sub-chirp and a second sub-chirp, in response to determining that a number of samples in the first set of samples is greater than the GCD.

3. The method of claim 1, further comprising dividing the second set of samples into a first sub-chirp and a second sub-chirp, in response to determining that a number of samples in the second set of samples is greater than the GCD.

4. The method of claim 1, further wherein reading the first set of samples is performed by a direct memory access (DMA) and writing the second set of samples is performed by the DMA.

5. The method of claim 1, further comprising:
setting a lane rate to a highest sampling rate of the at least one ADC for the radar signal frame; and
wherein sampling the first chirp and the second chirp are performed using a high speed interface (HSI) having the lane rate.

6. The method of claim 1, wherein the elastic buffer is configured as a ping-pong buffer.

7. The method of claim 1, further comprising decimating the first set of samples of the plurality of chirps of the radar signal frame using a decimator, the decimator coupled between the at least one ADC and the elastic buffer.

8. The method of claim 1, wherein writing the second set of samples is performed while reading the first set of samples.

9. The method of claim 1, further comprising:
generating, by a waveform generator, a waveform, based on waveform data from a first signal processor; and
driving, by a power amplifier, at least one antenna, based on the waveform.

10. The method of claim 9, further comprising: transmitting a plurality of transmitted chirps, based on the waveform, wherein the plurality of chirps is a reflection of the plurality of transmitted chirps.

11. A radar chip, comprising:
an analog front end configured to receive a plurality of chirps in a radar signal frame, the plurality of chirps comprising a first chirp and a second chirp;
at least one analog-to-digital converter (ADC) coupled to the analog front end, the at least one ADC configured to:
sample the first chirp, to generate a first set of samples; and
sample the second chirp, to generate a second set of samples;
an elastic buffer that includes a set of memory blocks, wherein a size of each of the set of memory blocks is equal to a greatest common divisor (GCD) across the plurality of chirps in the radar signal frame; and
a direct memory access (DMA) coupled to the elastic buffer, the DMA configured to:
read the first set of samples of the first chirp from a first memory block of the elastic buffer; and
write the second set of samples of the second chirp to a second memory block of the elastic buffer.

12. The radar chip of claim 11, further comprising a high speed interface (HSI) coupled to the DMA and to at least one signal processor, wherein a lane rate of the HSI is a highest sampling rate used by the ADC in the radar signal frame.

13. The radar chip of claim 11, wherein writing the second set of samples is performed while reading the first set of samples.

14. The radar chip of claim 11, wherein the elastic buffer comprises a ping-pong buffer.

15. The radar chip of claim 11, further comprising:
a waveform generator wherein the waveform generator directly synthesizes a waveform after receiving waveform data; and
a transmit antenna coupled to the waveform generator, the transmit antenna configured to transmit a plurality of transmitted chirps, based on the waveform, wherein the plurality of chirps is a reflection of the plurality of transmitted chirps.

16. The radar chip of claim 15, further comprising a digital-to-analog converter (DAC) coupled between at least one signal processor and the waveform generator, the DAC configured to send the waveform data to the waveform generator.

17. The radar chip of claim 11, further comprising a decimator coupled between the ADC and the elastic buffer.

18. A radar system, comprising:
- a receive antenna configured to receive a plurality of chirps in a radar signal frame, the plurality of chirps comprising a first chirp and a second chirp;
- at least one analog-to-digital converter (ADC) coupled to the receive antenna, the at least one ADC configured to:
  - sample the first chirp, to generate a first set of samples; and
  - sample the second chirp, to generate a second set of samples;
- an elastic buffer;
- at least one signal processor coupled to the at least one ADC and to the elastic buffer, the at least one signal processor configured to control a size of each of a first memory block and a second memory block of the elastic buffer to be equal to a greatest common divisor (GCD) across the plurality of chirps in the radar signal frame; and
- a direct memory access (DMA) coupled to the elastic buffer, the DMA configured to:
  - read the first set of samples of the first chirp from the first memory block of the elastic buffer, after the at least one signal processor controls the size of the first memory block of the elastic buffer; and
  - write the second set of samples of the second chirp to the second memory block of the elastic buffer, after the at least one signal processor controls the size of the second memory block of the elastic buffer.

19. The radar system of claim 18, wherein an output of the signal processor is coupled to an input of an engine control unit (ECU).

20. The radar system of claim 18, wherein the signal processor comprises one or more microcontroller units (MCUs).

* * * * *